United States Patent [19]
Prestidge et al.

[11] Patent Number: 5,707,071
[45] Date of Patent: Jan. 13, 1998

[54] SWAY STABILISATION SYSTEM

[75] Inventors: Leslie Walter Prestidge, Rockhampton; Lambert Von Batenburg, Mudjimba, both of Australia

[73] Assignee: Presbat Products Pty. Ltd., Rockhampton, Australia

[21] Appl. No.: 416,781

[22] PCT Filed: Oct. 6, 1993

[86] PCT No.: PCT/AU93/00514
§ 371 Date: Jun. 15, 1995
§ 102(e) Date: Jun. 15, 1995

[87] PCT Pub. No.: WO94/08804
PCT Pub. Date: Apr. 28, 1994

[30] Foreign Application Priority Data

Oct. 13, 1992 [AU] Australia ............... PL5222

[51] Int. Cl.$^6$ ............... B62D 1/00; B62D 53/00
[52] U.S. Cl. ............... 280/455.1; 280/432; 105/3; 213/75 R
[58] Field of Search ............... 280/432, 446.1, 280/455.1, 504, 515; 105/3, 4.2; 213/75 R, 189

[56] References Cited

U.S. PATENT DOCUMENTS

| | | |
|---|---|---|
| 3,825,282 | 7/1974 | Meinholdt ............... 280/455.1 |
| 4,556,231 | 12/1985 | Schultz ............... 280/432 |
| 4,763,916 | 8/1988 | Ratsko et al. ............... 280/432 |

FOREIGN PATENT DOCUMENTS

| | | |
|---|---|---|
| 0 253 964 | 4/1987 | European Pat. Off. . |
| 0 320 202 | 12/1988 | European Pat. Off. . |
| 29 49 333 | 6/1981 | Germany ............... 280/432 |
| 32 38 709 | 4/1984 | Germany ............... 280/432 |
| 8204588 | 6/1984 | Netherlands ............... 280/455.1 |

*Primary Examiner*—Victor E. Johnson
*Attorney, Agent, or Firm*—Abelman, Frayne & Schwab

[57] ABSTRACT

A sway stabilization system to inhibit an undesirable sideways sway between a towed vehicle (15) and a lead vehicle (14) comprises a brake assembly (17) having towed vehicle parts and lead vehicle parts operatively connected together in parallel with the draw bar and hitch assembly (16). The towed vehicle parts include a sway transmission member (21) secured to a draw bar (18). The lead vehicle parts include a braking surface carrier member (22), which engages with the draw bar (18), for pivoting movement with the sway transmission member (21) about the axis of the hitch pin, the braking surface carrier member (22) being subject to braking action by clutch plates (33, 34) in response to undesirable sway being detected by a coupling sensor (36).

24 Claims, 5 Drawing Sheets

SWAY STABILISATION SYSTEM

BACKGROUND OF THE INVENTION AND DESCRIPTION OF THE RELATED ART

THIS INVENTION relates to a sway stabilization system for a towed vehicle drawn behind a lead vehicle and in particular but not limited to a sway stabilization system for an articulated vehicle of the type having a prime mover coupled to a first trailer via a fifth wheel coupling and one or more towed trailers behind the first trailer.

Undesirable sway between a towed vehicle and a lead vehicle can lead to the towed vehicle moving out of control and causing an accident. One typical accident is known as a "jack-knife" where the towed vehicle swivels out of control relative to the lead vehicle possibly shearing its coupling to the lead vehicle and rolling or causing the lead vehicle to roll as well.

Undesirable sway can cause accidents when a vehicle is turning, when a vehicle is braking or during collision, and it would be desirable to provide a system to stabilize sway and thereby inhibit undesirable sway during these situations.

SUMMARY OF THE INVENTION

With the foregoing and other objects in mind, the present invention resides in one aspect in a sway stabilization system to inhibit undesirable side-ways sway of a towed vehicle relative to a lead vehicle, the system having a brake assembly including brake means disposed between the vehicles, sway detection means responsive to undesirable sway and brake control means responsive to detection of undesirable sway by the sway detection means to initiate operation of the brake means, the brake means being operable to inhibit undesirable sway and said brake control means being adapted to automatically actuate the brake means in response to detected undesirable sway while the vehicles are travelling.

The towed vehicle and lead vehicle are typically coupled together using a hitch pin and draw bar assembly, the brake assembly comprising a hitch pin and draw bar follower means having opposed ends coupled to the towed vehicle and lead vehicle respectively in order to follow the hitch pin and draw bar assembly as the vehicles travel. One end of the hitch pin and draw bar follower means typically includes a sway transmission member protruding from the towed vehicle in parallel with the draw bar and extending toward the lead vehicle, and the opposed end of the hitch pin and draw bar follower means having a hollow pivotable braking surface carrier means secured to the lead vehicle and being adapted to receive the sway transmission member and pivot therewith in response to movement of the draw bar relative to the hitch.

The sway transmission member and/or the braking surface carrier means, are preferably flexibly mounted or otherwise moveably secured to the respective vehicles to allow limited torsional movement as the vehicles travel so as not to interfere with the normal operation of the hitch pin and the draw bar assembly.

The brake means typically comprises a horizontal braking surface coupled or otherwise secured to the pivotable braking surface carrier means and a controllably movable non-pivotable braking surface adapted to engage the pivotable braking surface in response to the brake control means initiating braking in order to automatically resist the pivotal movement of the draw bar relative to the hitch, thereby providing a braking action against undesirable sway.

The non-pivotable braking surface is preferably driven into braking contact with the pivotable braking surface using a drive means such as pneumatically operated pistons operating under influence of the brake control means in response to undesirable sway being detected by the sway detection means disposed on the vehicle. The sway detection means preferably employs one or more sensor means, the sensor means typically includes one or a plurality of sensors operating independently or in conjunction with one another, the sensors being selected from the following:

(i) a coupling transducer adapted to monitor angular position of the towed vehicle relative to the lead vehicle;

(ii) a steering transducer adapted to monitor vehicle steering;

(iii) a collision transducer adapted to sense a collision condition; and/or (iv) a footbrake transducer adapted to monitor operation of a footbrake operated by a driver of the vehicles.

In one typical embodiment, the transducers supply data to a cab decision circuit with the steering transducer, collision transducer and footbrake transducer being located on a cab of a prime mover, the cab decision circuit operating in conjunction with the data supplied from the transducers to actuate the brake means to inhibit undesirable sway. Typically, an independent trailer decision circuit is employed which responds to undesirable sway being detected by the coupling transducer where say, oscillation of the towed vehicle away from a predetermined position occurs more than once within a predetermined time period, then the brake means is applied for a short period of time, the application of the brake means being made when the coupling transducer detects the trailer oscillation passing through or adjacent the predetermined position. For example, application of the brake means would occur for say a seven second application and then be released. This would occur automatically under this type of control.

In the case of a collision or sudden braking action by the vehicle driver, the collision transducer would detect this and the brake control means would automatically apply the brake means for say five seconds.

The brake control means would continually monitor the steering transducer to determine whether the trailer is in a normal position according to any turning action being imposed on the vehicles by normal steering. This would be taken into account before application of the brake means. The brake means would operate whenever the footbrake is applied or alternatively would operate only in response to undesirable sway. Preferably a manual over-ride switch is employed so that the brake means can be turned off and by-passed or turned on as an aid to reversing the vehicles.

BRIEF DESCRIPTION OF THE DRAWINGS

In order that the present invention can be more readily understood and be put into practical effect, reference will now be made to the accompanying drawings which illustrate preferred embodiments of the invention and wherein.

DETAILED DESCRIPTION OF PREFERRED EMBODIMENTS

Figure 1:
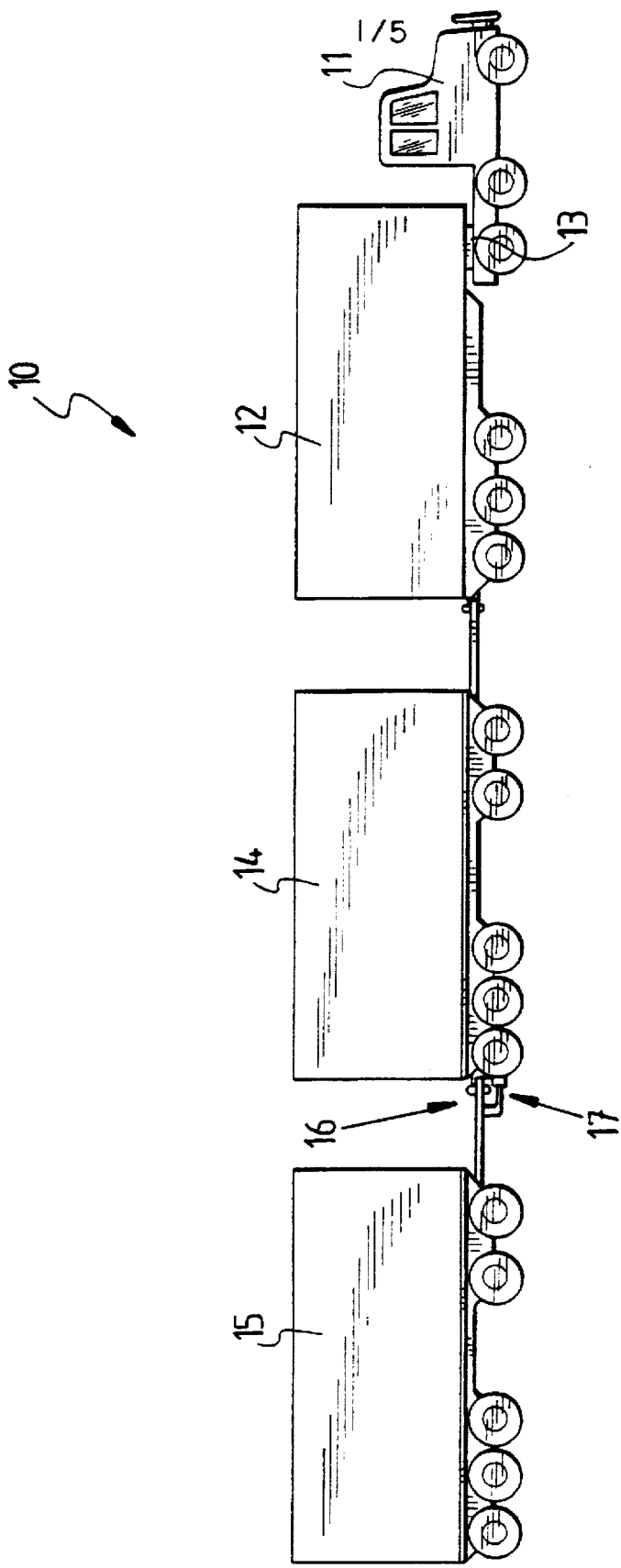
FIG. 1 is a schematic side view illustrating vehicles employing a sway stabilization system according to the present invention.

Referring to the drawings and initially to FIG. 1, there is illustrated a vehicle in the form of a road train 10 having a prime mover 11, a first trailer 12 articulated to the prime mover 11 via a fifth wheel coupling 13, and second and third trailers 14 and 15. The trailer 14 comprises a lead vehicle while the trailer 15 comprises a towed vehicle, the lead vehicle and towed vehicle being coupled together using a draw bar and hitch assembly shown generally at 16. Undesirable sway between the lead vehicle 14 and towed vehicle 15 is stabilized using a sway stabilization system according to the present invention. The sway stabilization system employs a brake assembly shown generally at 17, the brake assembly having respective towed vehicle parts and lead vehicle parts operatively coupled together in parallel with the draw bar and hitch assembly 16.

Figure 2:
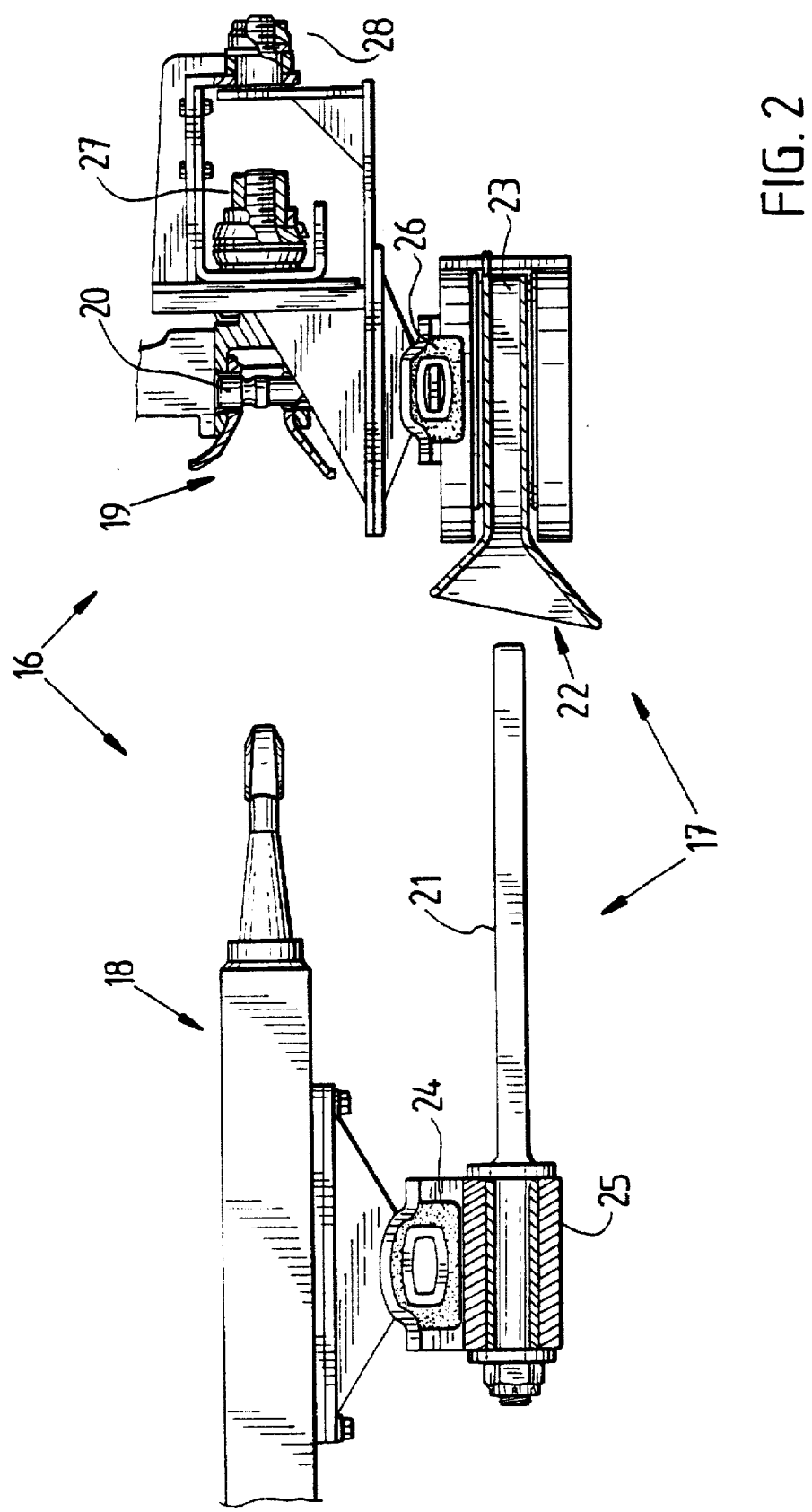
FIG. 2 is a part sectional view illustrating a preferred brake assembly suitable for use in a sway stabilization system according to the present invention and showing the parts of the assembly separated.

Referring now to FIG. 2, there is illustrated the draw bar and hitch assembly 16 and the brake assembly 17 prior to the lead vehicle and towed vehicle being coupled together. The draw bar and hitch assembly 16 includes a draw bar 18 and a hitch 19 employing a hitch pin 20 so that the draw bar 18 can pivot in a generally side-ways direction and also move up and down according to steering and road undulations respectively.

The brake assembly 17 includes a towed vehicle part in the form of a sway transmission member comprising a flattened bar 21 protruding toward the lead vehicle and secured to the draw bar 18 generally parallel thereto. The bar 21 is aligned with co-operating lead vehicle part in the form of a braking surface carrier means 22 having an elongate recess 23 adapted to automatically take the bar 21 and hold it captive by virtue of the draw bar 18 being coupled to the hitch 19. The bar 21 is coupled to the draw bar via a rubber mount at 24, the bar 21 having a fixed end secured in rubber bushing at 25 so that the bar 21 is capable of limited torsional movement away from its parallel position in relation to the draw bar 18. Similarly the braking surface carrier means 22 is mounted to the lead vehicle via a rubber mounting 26 so that it too can tolerate torsion. The hitch 19 and braking surface carrier means are adapted to pivot on stubs 27 and 28 in response to relative movement between the vehicles.

Figure 3:
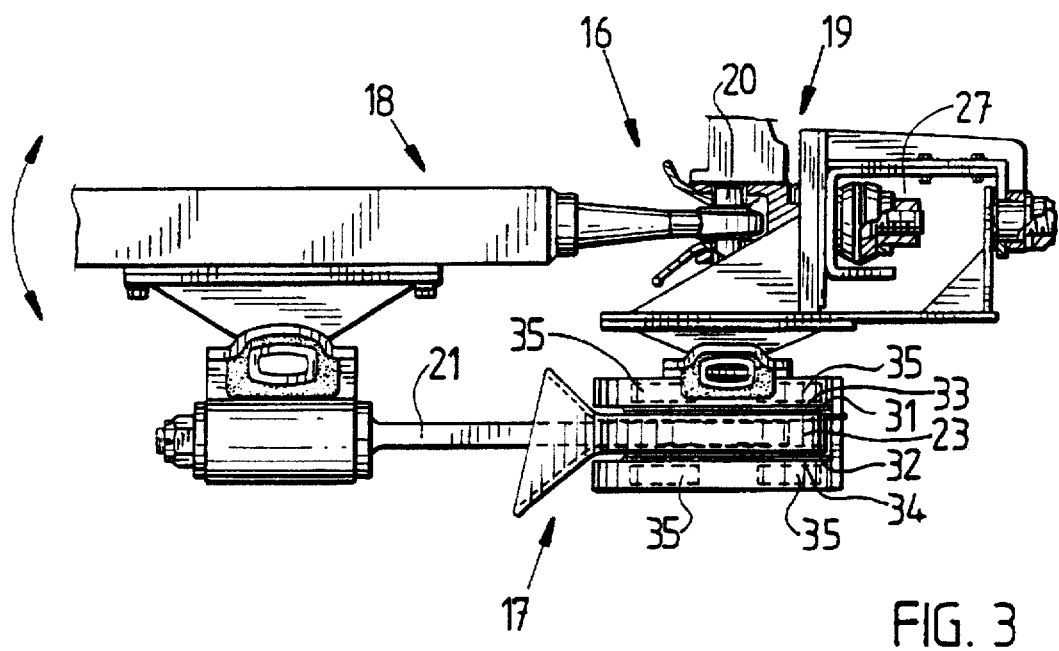
FIG. 3 is a view similar to that of FIG. 2 but with the parts of the assembly operatively coupled together.

Referring now to FIG. 3, the hitch and draw bar assembly 16 and the brake assembly 17 are shown coupled together and where appropriate like numerals have been used to illustrate like features. The braking surface carrier means 22 includes a lead-in guide 29 for the bar 21 and a circular portion 30 which carries on upper and lower surfaces thereof respective braking pads 31 and 32. The pads are secured to the surfaces or integrally formed therewith. The braking pads pivot with the braking surface carrier means 22 in response to movement of the bar 21. Respective clutch plates 33 and 34, are disposed as controllably movable non-pivotable braking surfaces adjacent the respective brake pads 31 and 32 and are linearly moveable by operation of eight pneumatic pistons located four top and four bottom as shown at 35.

A controller for automatically actuating the brake means is employed to activate the pneumatic pistons to apply the clutch plates 33 and 34 to the brake pads 31 and 32 whenever undesirable sway is detected by sensors (to be described below) in order to inhibit undesirable sway.

Figure 4:
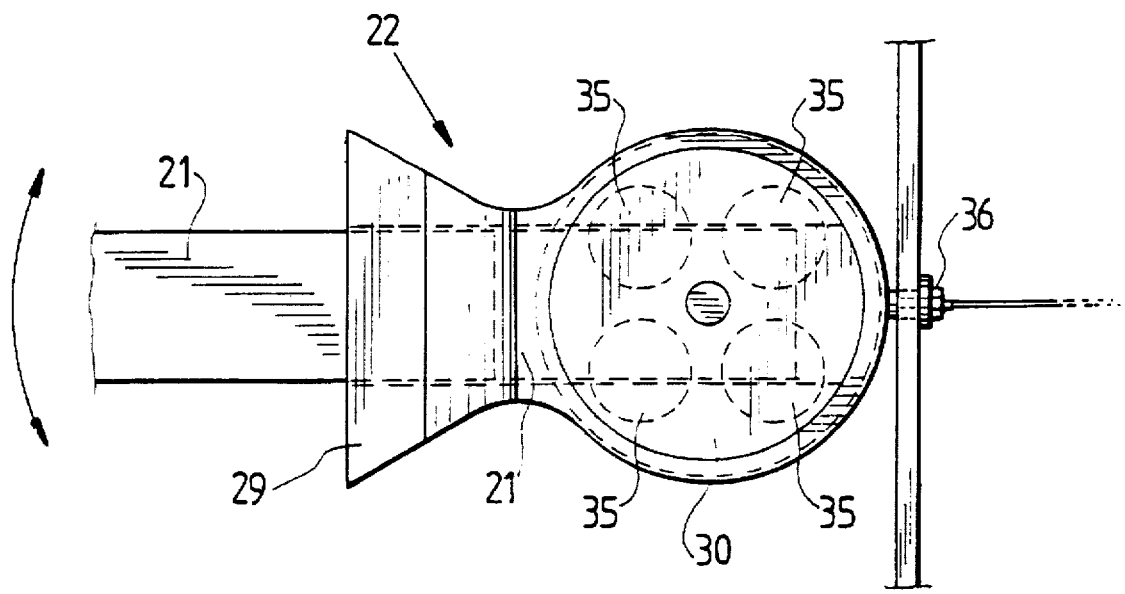
FIG. 4 is a plan view illustrating the parts operatively coupled together.

One of these sensors is a coupling transducer depicted in FIG. 4 in the form of a proximity switch 36 which monitors steady angular motion of the towed vehicle relative to the lead vehicle. The proximity switch operates in conjunction with a decision circuit to be described below and takes account of abnormal relative motion to initiate braking via the controller.

Figure 5:
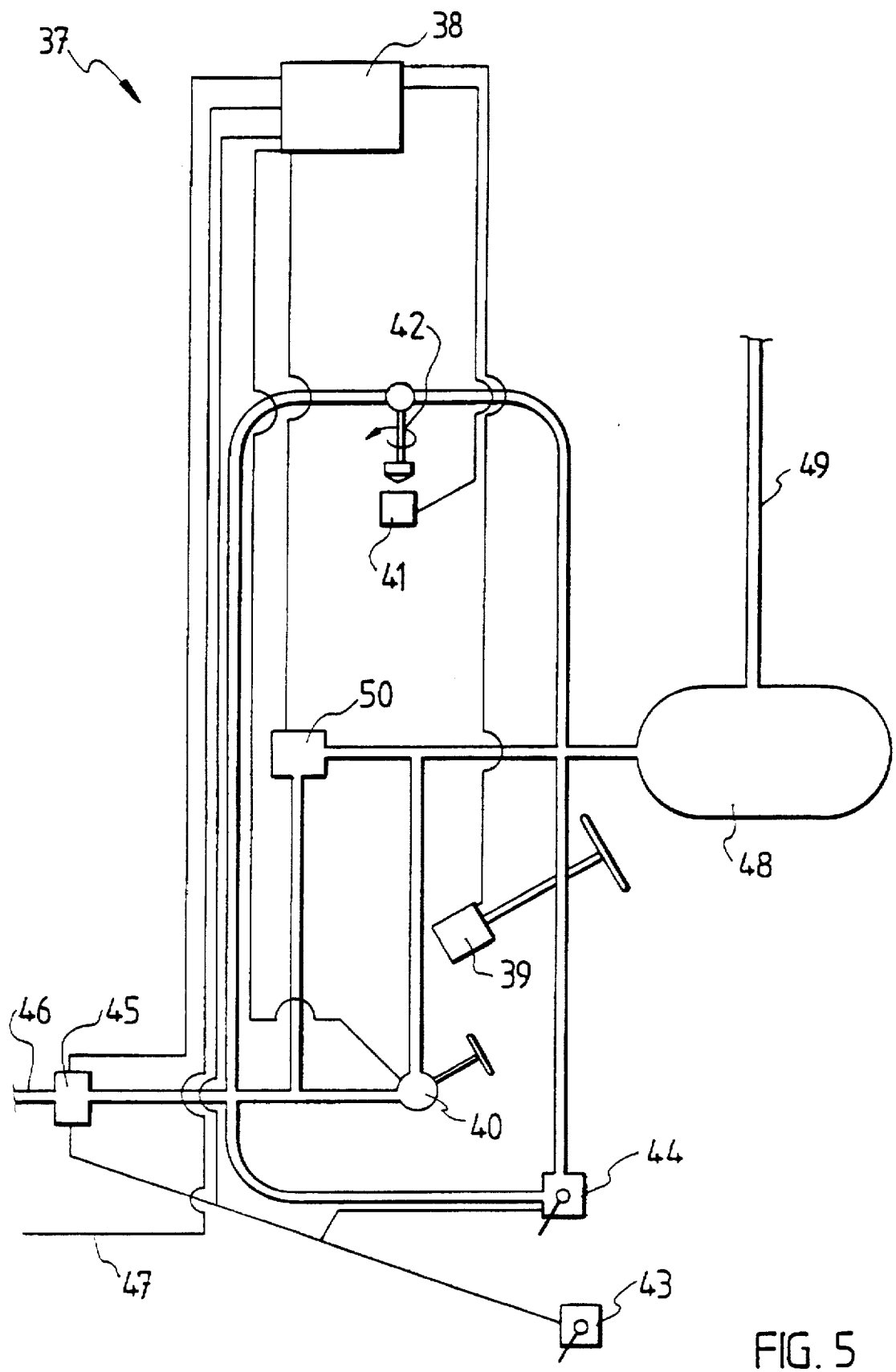
FIG. 5 is a schematic circuit diagram illustrating part of brake control means suitable for a sway stabilization system according to the present invention.

Referring now to FIG. 5, a typical controller 37 is illustrated including an electrical circuit portion and a pneumatic circuit portion, the electrical circuit portion includes a decision making circuit 38 and a plurality of sensors including a steering wheel position transducer 39, a footbrake position transducer 40, a collision transducer 41 including an inertial sensor 42 and manual switches 43 and 44. The manual switch 43 is operable to inhibit operation of solenoid valve 45 in order to by-pass operation of the brake means. The manual switch 44 includes a pneumatic valve as well as an electrical switch so that the pneumatic pistons 35 can receive compressed air along line 46 so that the brake means can be applied while a driver is reversing the vehicles. In this embodiment an input lead 47 from the controller is coupled to the proximity sensor 36 (see FIG. 4). Compressed air for operation of the pneumatic pistons 35 is held ready in a storage tank 48 having been previously generated by a compressor communicating with the tank 48 via compressed air line 49. The tank 48 is mounted adjacent the brake means on the rear of the lead vehicle 14.

The decision making circuit 38 monitors the position of the steering wheel sensor 39 and thereby deduces normal appropriate positions of the towed vehicle relative to the lead vehicle. Departures from normal operation are detected by the other sensors to initiate braking via the controller. Operation of the footbrake 40 can initiate operation of the pneumatic pistons 35 while on other occasions, operation of the pneumatic pistons is via solenoid valves 45 and 50 via the controller.

The duration of application of braking force via the pneumatic pistons 35 is usually for short time periods only, the time periods being of the order of five to seven seconds. In the case of the footbrake, the duration of braking is for the duration of manual braking applying the vehicle's standard braking system.

Figure 6:
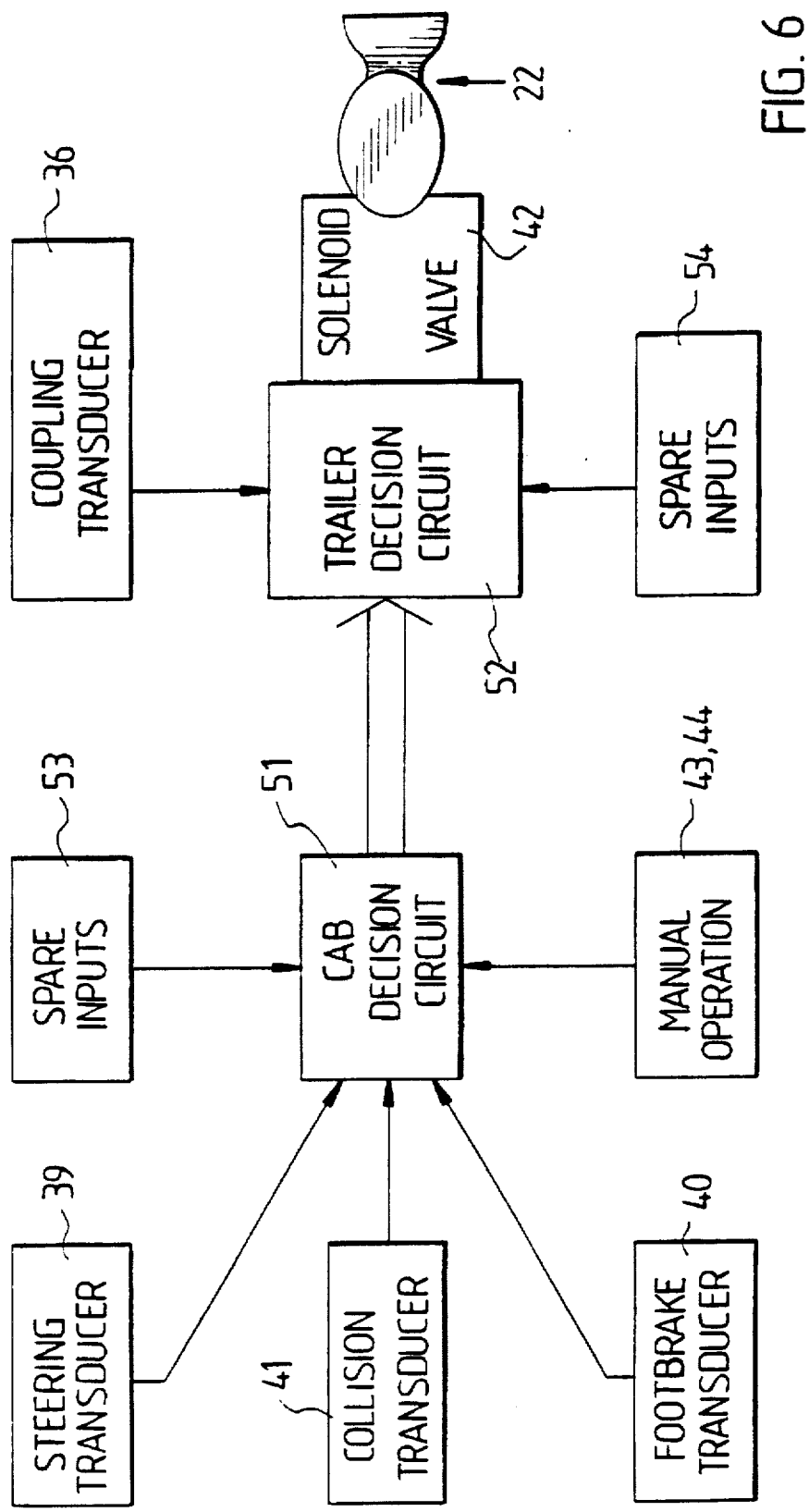
FIG. 6 is a block diagram illustrating operation of a typical electrical circuit portion of a second embodiment of a brake control means suitable for a sway stabilization system according to the present invention.

An alternative electrical circuit is illustrated in FIG. 6 and where this circuit employs the same transducers as in previous FIG. 5, appropriate like numerals have been used to illustrate like features. The decision making circuit in this case has been divided into two circuit elements being a cab decision circuit 51 and a trailer decision circuit 52, both decision circuits having extra inputs 53 and 54, it being appreciated that automatic operation of the brake means can be initiated by particular conditions being sensed by the coupling transducer 36 quite apart from the other sensors. In this case, braking is initiated at the trailer without any need for data from the other transducers. This typically occurs where there are repeated detections of the trailer moving outside normal conditions in an oscillatory fashion within say a five second interval. This condition is indicative of undesirable sway thereby immediately initiating operation of the brake means for say a five second period via the trailer decision circuit.

As the brake means operates independently of the vehicle's standard braking system there is no possibility of the sway stabilization system interfering with normal braking.

Whilst the above has been given by way of illustrative example of the present invention, many variations and modifications thereto will be apparent to those skilled in the art without departing from the broad ambit and scope of the invention as set forth in the appended claims.

We claim:

1. A sway stabilization system to inhibit an undesirable side-ways sway between a towed vehicle and a lead vehicle, the system having a brake assembly including brake means disposed between the vehicles, sway detection means responsive to undesirable sway and a brake control means responsive to detection of undesirable sway by the sway detection means to initiate operation of the brake means, the brake means being operable to inhibit undesirable sway and the brake control means being adapted to automatically actuate the brake means in response to detected undesirable sway while the vehicles are travelling, wherein the towed vehicle and lead vehicle are coupled together using a hitch pin and draw bar assembly, the brake assembly comprising a hitch pin and draw bar follower means having opposed ends coupled to the towed vehicle and lead vehicle respectively in order to follow the hitch pin and draw bar assembly as the vehicles travel, one end of the hitch pin and draw bar follower means including a sway transmission member protruding from the towed vehicle in parallel with the draw bar and extending toward the lead vehicle, and the opposed end of the hitch pin and draw bar follower means having a hollow pivotable braking surface carrier means secured to the lead vehicle and being adapted to receive the sway transmission member and rotate therewith in response to movement of the draw bar relative to the hitch.

2. The system according to claim 1 wherein the sway transmission member is moveably secured to the towed vehicle to allow limited torsional movement as the vehicles travel so as not to interfere with the normal operation of the hitch pin and the draw bar assembly.

3. The system according to claim 1 wherein the brake means comprises a horizontal braking surface secured to the pivotable braking surface carrier means and a controllably movable non-pivotable braking surface adapted to engage a pivotable braking surface secured to the pivotable braking surface carrier means in response to the brake control means initiating braking in order to automatically resist the pivotal movement of the draw bar relative to the hitch, thereby providing a braking action against undesirable sway.

4. The system according to claim 3 wherein the non-pivotable braking surface is driven into braking contact with the pivotable braking surface using a drive means operating under influence of the brake control means in response to undesirable sway being detected by the sway detection means.

5. The system according to claim 1 wherein the braking surface carrier means is preferably moveably secured to the lead vehicle to allow limited torsional movement as the vehicles travel so as not to interfere with the normal operation of the hitch pin and the draw bar assembly.

6. A sway stabilization system for controlling undesirable sway of a towed vehicle relative to a lead vehicle, said vehicles being coupled together by a hitch pin and a draw bar, said sway stabilization system including:

hitch pin and draw bar follower means including a sway transmission member adapted for mounting to the towed vehicle for relative pivoting movement in parallel with the draw bar about said hitch pin and a pivotable braking surface carrier means adapted for securement to the lead vehicle, said pivotable braking surface carrier means being adapted to cooperate with said sway transmission member for pivoting movement therewith in response to movement of the draw bar relative to the hitch pin;

brake means adapted to selectively apply a braking force to said pivotable braking surface carrier means to inhibit pivoting movement of said draw bar relative to said hitch pin;

sway detection means for detecting relative pivoting movement of said draw bar about said hitch pin; and brake control means for automatically actuating said brake means in response to detected undesirable pivoting movement of said draw bar.

7. A sway stabilization system according to claim 6, wherein said sway transmission member includes mounting means for mounting said sway transmission member to said draw bar.

8. A sway stabilization system according to claim 7, wherein said mounting means allows limited movement of said sway transmission member relative to said draw bar.

9. A sway stabilization system according to claim 8, wherein said mounting means includes a resilient mounting member.

10. A sway stabilization system according to claim 7, wherein said braking surface carrier means includes mounting means for mounting said braking surface carrier means to said lead vehicle for limited movement relative thereto.

11. A sway stabilization system according to claim 10, wherein said mounting means includes a resilient mounting member.

12. A sway stabilization system according to claim 7, wherein said braking surface carrier means has at least one horizontal braking surface and said brake means is adapted to engage said at least one horizontal braking surface to apply said braking force.

13. A sway stabilization system according to claim 12, wherein said braking surface carrier means has two opposed horizontal braking surfaces and said brake means is adapted to engage both of said surfaces.

14. A sway stabilization system according to claim 13, wherein said brake means includes a pair of opposed brake pads adapted to engage said opposed horizontal braking surfaces respectively.

15. A sway stabilization system according to claim 14, wherein said opposed brake pads are driven into engagement with said horizontal braking surfaces by pneumatically operated pistons.

16. A sway stabilization system according to claim 7, wherein said sway transmission member includes a bar portion and said braking surface carrier means has a recess adapted to receive said bar portion.

17. A sway stabilization system according to claim 16, wherein said spigot portion extends forwardly beyond said draw bar to allow engagement of said spigot portion in said recess prior to engagement of said draw bar with said hitch pin.

18. A sway stabilization system according to claim 6, wherein said sway detection means includes at least one sensor from the group consisting of:

(i) a coupling transducer adapted to monitor angular position of the towed vehicle relative to the lead vehicle;

(ii) a steering transducer adapted to monitor vehicle steering;

(iii) a collision transducer adapted to sense a collision condition; and (iv) a footbrake transducer adapted to monitor operation of a footbrake operated by a driver of the vehicles.

19. A sway stabilization system according to claim 18, including a cab decision circuit for selectively actuating said brake means to inhibit undesirable sway, said decision circuit being adapted to receive data from at least one sensor selected from the group, which is a subgroup of the group specified in claim 18, consisting of:
  (i) said steering transducer adapted to monitor vehicle steering;
  (ii) said collision transducer adapted to sense a collision condition; and
  (iii) said footbrake transducer adapted to monitor operation of a footbrake operated by a driver of the vehicles.

20. A sway stabilization system according to claim 19, and further including a trailer decision circuit for selectively actuating said brake means in response to detection of undesirable sway by said coupling transducer.

21. A sway stabilization system according to claim 20, wherein said trailer decision circuit causes actuation of said brake means for a short period of time upon detection of oscillation of said towed vehicle above a predetermined frequency.

22. A sway stabilization system according to claim 21, wherein the coupling transducer is adapted to detect movement of said draw bar with respect to a predetermined position to determine said frequency of said oscillation.

23. A sway stabilization system according to claim 6, wherein the vehicles include a wheel braking system actuated by a footbrake and said brake means is adapted for operation independently of said wheel braking system.

24. A sway stabilization system to inhibit an undesirable side-ways sway between a towed vehicle and a lead vehicle, the system having a brake assembly including brake means disposed between the vehicles, sway detection means responsive to undesirable sway and a brake control means responsive to detection of undesirable sway by the sway detection means to initiate operation of the brake means, the brake means being operable to inhibit undesirable sway and the brake control means being adapted to automatically actuate the brake means in response to detected undesirable sway while the vehicles are travelling, wherein the sway detection means includes at least one sensor from the group consisting of:
  (i) a coupling transducer adapted to monitor angular position of the towed vehicle relative to the lead vehicle;
  (ii) a steering transducer adapted to monitor vehicle steering;
  (iii) a collision transducer adapted to sense a collision condition; and
  (iv) a footbrake transducer adapted to monitor operation of a footbrake operated by a driver of the vehicles;

and wherein the transducers supply data to a cab decision circuit with the steering transducer, collision transducer and footbrake transducer located on a cab of a prime mover, the cab decision circuit operating in conjunction with the data supplied from the transducers to actuate the brake means to inhibit undesirable sway, the system further comprising an independent trailer decision circuit which responds to undesirable sway being detected by the coupling transducer, where oscillation of the towed vehicle away from a predetermined position occurs more than once within a predetermined time period, by causing the application of the brake means for a short period of time, the application of the brake means being made when the coupling transducer detects the oscillation of the towed vehicle in the vicinity of the predetermined position.

* * * * *